E. RABER.
HORSE HAY-FORKS.
No. 169,919. Patented Nov. 16, 1875.
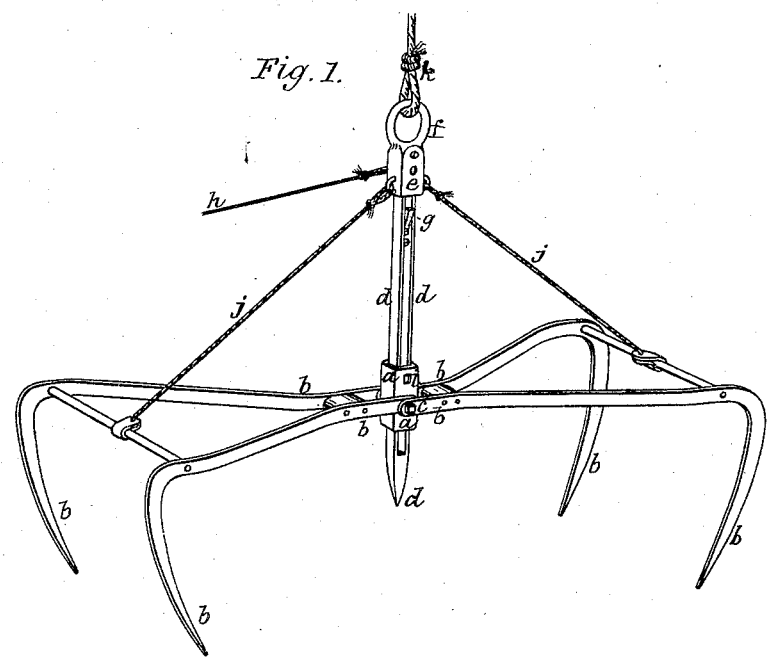
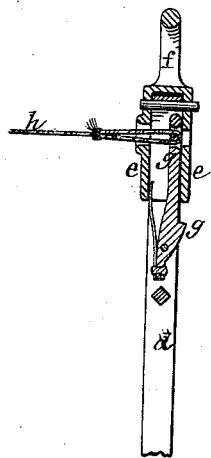 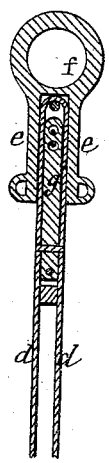
Witnesses
D. P. Cowl
Edmund Masson
Inventor:
Emanuel Raber
By atty A. B. Stoughton

UNITED STATES PATENT OFFICE.

EMANUEL RABER, OF CANTON, OHIO.

IMPROVEMENT IN HORSE HAY-FORKS.

Specification forming part of Letters Patent No. 169,919, dated November 16, 1875; application filed May 18, 1875.

*To all whom it may concern:*

Be it known that I, EMANUEL RABER, of Canton, in the county of Stark and State of Ohio, have invented certain new and useful Improvements in Horse Hay - Forks; and I do hereby declare the following to be a full, clear, and exact description of the same, reference being had to the accompanying drawings, making a part of this specification, in which—

Figure 1 represents, in perspective, the position of the forks and the spear when they have been tripped to drop the load they have elevated, and in which they appear when about to be reloaded or recharged with the hay. Figs. 2 and 3 represent vertical sections through the head and upper portion of the spear, to show the devices connected therewith.

My invention consists in the combination of the hinged forks with the head to which they are connected, and the sliding spear moving through said head, and the attachments by which the hay-fork is operated, as will be explained.

The head $a$, to which the forks $b\ b$ are hinged, as at $c$, is made hollow, and, by preference, the opening through it is made rectangular, so that the spear $d$, which is of similar form, may, when not otherwise controlled, freely slide through it to a defined extent. The spear $d$ has a long slot through it, and the pivot pin or screw $c$, by which the forks are hinged to the head $a$, passes through this slot, as well as through the side bars of the forks $b\ b$.

The spear $d$ may be made mainly of strap or thin bar metal, bent around at the top, and with sufficient space between the sides to form the slot, with a solid point, as seen in the drawings.

On the top of the spear $d$ there is a head, $e$, on which the ring or eye $f$, to which the hoisting-rope $k$ is attached, is wrought or united, and in this head partially, and in the portion of the slot in the spear immediately below said head, is pivoted a spring latch or trigger, $g$, which, when the two heads $a\ e$ are brought together, latches or catches into an opening, $i$, in the head $a$, and holds the two heads together in a locked position. A line, rope, or cord, $h$, is fastened to the upper end of the spring latch or trigger, which, when pulled upon, draws the latch out of the opening $i$, and then the head and forks can slide down upon the spear, or the spear be raised up through the head, as the case may be.

The forks $b\ b$ are connected to the head $e$ of the spear by ropes or cords, $j\ j$, and when the forks slide down upon the spear, or when the spear is drawn up through the head $a$, said forks, by means of the ropes or cords $j$, are swung open, so as to drop the load of hay they have been griping or raising.

The hay-fork, as shown in Fig. 1, is in the position to grasp the bundle or load of hay to be raised up for stacking or storing. The spear $d$ is first inserted in the bundle or load, and this slackens the cords $j\ j$ so that the forks $b\ b$ may be thrust into, so as to hold on and between their tines, the load of hay or similar material to be raised. As the spear is run down into the hay, its head or portion that carries the spring-latch $g$ approaches the head $a$, to which the forks $b$ are hinged, until the keeper on the spring-latch $g$ finds the opening $i$ in the head $a$, into which it is forced by its spring, and the spear $d$, head $a$, and forks $b$ are locked or held together, while they also contain or hold the load to be raised. In this position the raising power is applied to the rope $k$, and the load is carried up and swung, if necessary, over the point where it is to be dumped or deposited, when, by drawing upon the cord or rope $h$, the latch is disconnected, the spear is drawn out of the bundle or load, and in moving draws upon the cords $j$, which, in turn, draw out the forks, and the load, being thereby released, drops. The fork, after delivering its load, is in position to be recharged or reloaded, as hereinabove mentioned.

Having thus fully described my invention, what I claim is—

In combination with the forks hinged to the head $a$, and the spear sliding through said head, the cords $j$ and $h$, and the spring-latch $g$, and opening $i$ in the head $a$, whereby the hay-fork may be readily loaded with hay, and as readily freed or discharged of it, substantially as described and represented.

EMANUEL RABER.

Witnesses:
 C. F. PERKINS,
 LEVI L. DEWEESE.